(12) United States Patent
Dun et al.

(10) Patent No.: US 10,018,880 B2
(45) Date of Patent: Jul. 10, 2018

(54) ARRAY SUBSTRATE AND DISPLAY PANEL

(71) Applicants: SHANGHAI AVIC OPTO ELECTRONICS CO., LTD, Shanghai (CN); TIANMA MICRO-ELECTRONICS CO., LTD., Shenzhen (CN)

(72) Inventors: Dongliang Dun, Shanghai (CN); Xuejing Zhu, Shanghai (CN); Huijun Jin, Shanghai (CN); Wantong Shao, Shanghai (CN)

(73) Assignees: SHANGHAI AVIC OPTO ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/352,569

(22) Filed: Nov. 15, 2016

(65) Prior Publication Data
US 2017/0059951 A1  Mar. 2, 2017

(30) Foreign Application Priority Data
Aug. 3, 2016  (CN) .......................... 2016 1 0628141

(51) Int. Cl.
| | | |
|---|---|---|
| *F21V 23/04* | (2006.01) | |
| *F21V 21/00* | (2006.01) | |
| *G02F 1/1343* | (2006.01) | |
| *G09G 3/20* | (2006.01) | |

(Continued)

(52) U.S. Cl.
CPC .. *G02F 1/134336* (2013.01); *G02F 1/136286* (2013.01); *G06F 1/3265* (2013.01); *G09G 3/2074* (2013.01); *G02F 2001/134345* (2013.01); *G02F 2001/136222* (2013.01); *G02F 2201/52* (2013.01); *G09G 2300/0809* (2013.01);

(Continued)

(58) Field of Classification Search
CPC ........... G02F 1/134336; G02F 2201/52; G02F 2201/134345; G09G 3/2074
See application file for complete search history.

(56) References Cited

U.S. PATENT DOCUMENTS

2004/0021677 A1* 2/2004 Sasaki .................. G09G 3/3611
                                                                    345/694
2013/0002992 A1* 1/2013 Hirata .................... G02F 1/1362
                                                                    349/85

(Continued)

*Primary Examiner* — Donald Raleigh
(74) *Attorney, Agent, or Firm* — Kilpatrick Townsend & Stockton LLP

(57) ABSTRACT

An array substrate and a display panel are provided according to embodiments, which include: a first substrate; multiple data lines and multiple scan lines located on a first side of the first substrate. The multiple data lines and multiple scan lines define a pixel array. The pixel array includes multiple sub-pixels. A length of each of the sub-pixels in an extension direction of the data lines is less than a width of each of the sub-pixels in an extension direction of the scan lines. The pixel array includes multiple first pixel groups and multiple second pixel groups arranged in a matrix form. A type of each of the sub-pixels included in the first pixel groups is different from a type of each of the sub-pixels in the second pixel groups. The first pixel groups and the second pixel groups are arranged alternately.

20 Claims, 21 Drawing Sheets

(51) Int. Cl.
*G06F 1/32* (2006.01)
*G02F 1/1362* (2006.01)
(52) U.S. Cl.
CPC ...... *G09G 2330/021* (2013.01); *Y02D 10/153* (2018.01)

(56) References Cited

U.S. PATENT DOCUMENTS

2013/0044090 A1\* 2/2013 Wu .................. G02F 1/136213
 345/204
2016/0306237 A1\* 10/2016 Okita ................ G02F 1/134309

\* cited by examiner

ARRAY SUBSTRATE AND DISPLAY PANEL

CROSS REFERENCE TO RELATED APPLICATION

The present application claims priority to Chinese Patent Application No. 201610628141.7, titled "ARRAY SUBSTRATE AND DISPLAY PANEL", filed on Aug. 3, 2016 with the State Intellectual Property Office of the People's Republic of China, which is hereby incorporated herein by reference in its entirety.

TECHNICAL FIELD

The present disclosure relates to the field of display technology, and in particular to an array substrate and a display panel including the array substrate.

BACKGROUND

With the development of display technology, display panels are more and more widely used. As shown in FIG. 1, a conventional display panel generally includes sub-pixels of three colors, i.e., a red sub-pixel 01, a green sub-pixel 02 and a blue sub-pixel 03. Each pixel point 04 corresponds to three sub-pixels of the red sub-pixel 01, green sub-pixel 02 and blue sub-pixel 03 which are arranged in parallel in an extension direction of a scan line 05, and each of the sub-pixels is connected to an adjacent data line 06. Therefore, each pixel point 04 corresponds to three data lines 06, resulting in a large number of required data lines 06 and thus a high power consumption of the conventional display panel in operation.

SUMMARY

In order to solve the above technical problems, an array substrate and a display panel including the array substrate are provided according to the disclosure to reduce a power consumption of the display panel.

To solve the above problems, the following technical solutions are provided in the disclosure.

In a first aspect, embodiments provide an array substrate, including: a first substrate; and multiple data lines and multiple scan lines located on a first side of the first substrate. The multiple data lines and the multiple scan lines define a pixel array. The pixel array includes multiple sub-pixels, and a length of each of the sub-pixels in an extension direction of the data lines is less than a width of each of the sub-pixels in an extension direction of the scan lines. The pixel array includes multiple first pixel groups and multiple second pixel groups, the first pixel groups and the second pixel groups are arranged in a matrix form, a type of each of the sub-pixels in the first pixel group is different from a type of each of the sub-pixels in the second pixel group, and the first pixel groups and the second pixel groups are arranged alternately in a first direction.

In a second aspect, embodiments provide a display panel such that the display panel includes an array substrate and a second substrate which are oppositely arranged and a liquid crystal layer located between the array substrate and the second substrate, where the array substrate is the above array substrate.

Compared with the conventional technology, the above technical solutions have the following advantages.

The array substrate according to the disclosure includes the first array substrate, the multiple data lines and the multiple scan lines located on the first side of the first substrate. The multiple data lines and the multiple scan lines define the pixel array. The pixel array includes the multiple sub-pixels, and the length of each of the sub-pixels in the extension direction of the data lines is less than the width of each of the sub-pixels in the extension direction of the scan lines. Therefore, sub-pixels corresponding to each pixel point in the array substrate can be arranged in the extension direction of the data lines, which enables the sub-pixels corresponding to the pixel point to share a data line, decreasing a number of the data lines required for display of each pixel point in the array substrate and reducing the power consumption of the array substrate.

BRIEF DESCRIPTION OF THE DRAWINGS

To illustrate technical solutions according to embodiments in the present disclosure or the conventional technologies more clearly, drawings to be used in the descriptions of the embodiments or the conventional technologies are described briefly hereinafter. Apparently, the drawings described hereinafter are only for some embodiments, and other drawings may be obtained by those skilled in the art based on those drawings without any creative work.

DETAILED DESCRIPTION OF THE EMBODIMENTS

Technical solutions of embodiments in the present disclosure are described clearly and completely herein with reference to the drawings for the embodiments in the present disclosure. Apparently, the described embodiments are only provided as examples and not intended to be limiting. Any other embodiments not described in the disclosure but obtained by those skilled in the art without creative effort on the basis of the embodiments in the present disclosure fall within the scope of the present disclosure.

Numerous details are set forth in the following description to provide a thorough understanding of the disclosure, but the technical solution in the present disclosure may be implemented with embodiments different from the described embodiments. Those skilled in the art can make equivalents without departing from the spirit of the disclosure. Therefore, the scope is not limited to the specific embodiments disclosed herein.

Figure 1:
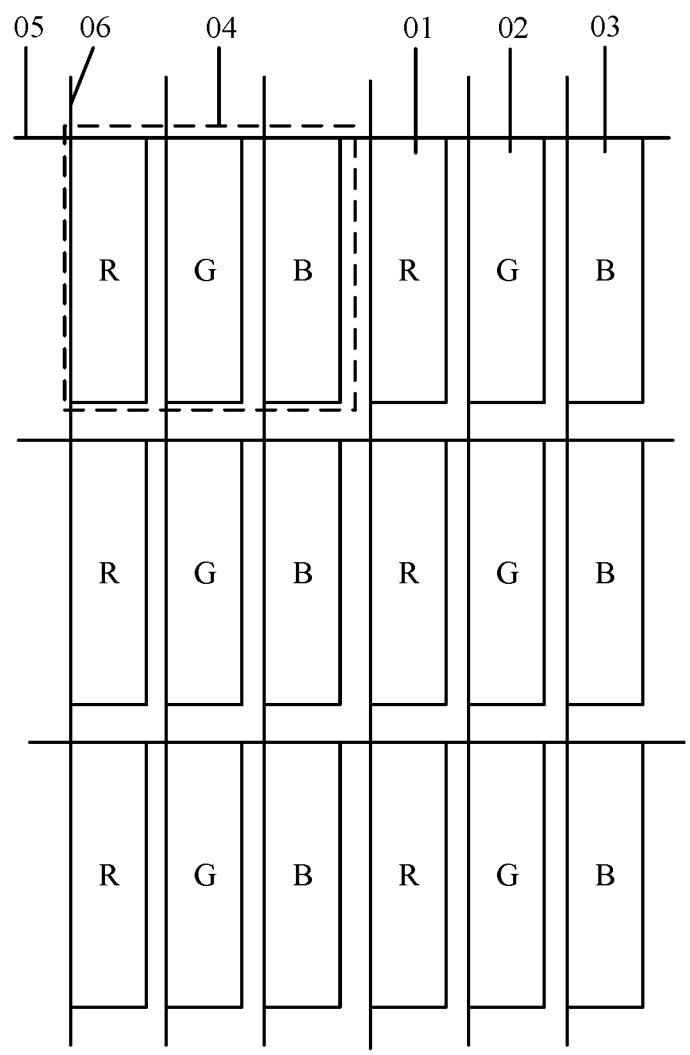
FIG. 1 is a top view of an array substrate in the conventional technology.
Figure 2:
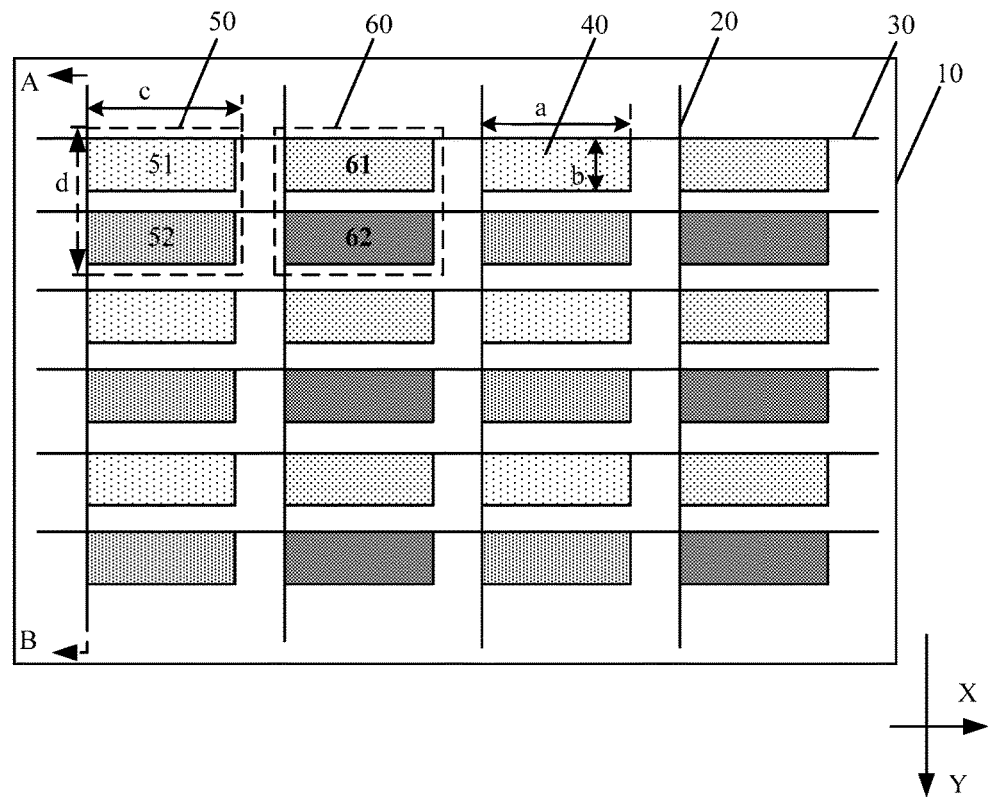
FIG. 2 is a top view of an array substrate according to an embodiment in the disclosure.
Figure 3:
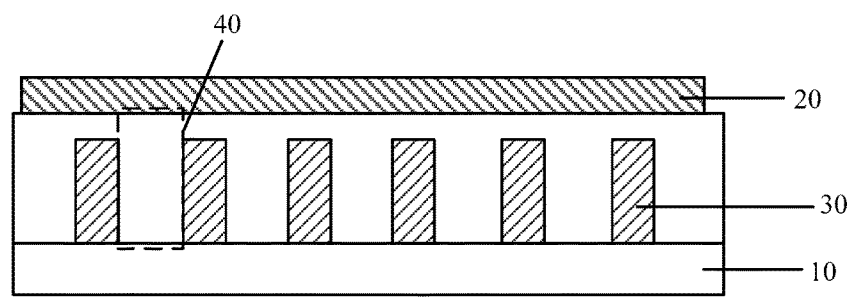
FIG. 3 is a sectional view of the array substrate as shown in FIG. 2 taken along a line AB.

Reference is made to FIG. 2 and FIG. 3. FIG. 2 is a top view of an array substrate according to an embodiment in the disclosure, and FIG. 3 is a sectional view of the array substrate as shown in FIG. 2 taken along a line AB. In this embodiment, the array substrate includes: a first substrate 10, multiple data lines 20 and multiple scan lines 30 located on a first side of the first substrate 10. The multiple data lines 20 and the multiple scan lines 30 define a pixel array. The pixel array includes multiple sub-pixels 40, a length of each of the sub-pixels 40 in an extension direction of the data lines 20 is less than a width of each of the sub-pixels 40 in an extension direction of the scan lines 30, that is, if denoting the width of each of the sub-pixels 40 in the extension direction of the scan lines 30 as a and denoting the length of each of the sub-pixels 40 in the extension direction of the data lines 20 as b, then b is less than a. The pixel array includes multiple first pixel groups 50 and multiple second pixel groups 60 which are arranged in a matrix form, a type of each of the sub-pixels 40 in the first pixel groups 50 is different from a type of each of the sub-pixels 40 in the second pixel groups 60, and the pixel groups 50 and the second pixel groups 60 are arranged alternately in a first direction X.

In a certain embodiment, the width of each of the sub-pixels 40 in the extension direction of the scan lines 30 is 2 to 4 times of the length b of each of the sub-pixels 40 in the extension direction of the data lines 20, inclusive. However this width specification is not intended to be limiting. It should be understood that the width of each sub-pixel 40 can be determined based on the number of the sub-pixels 40 included in each of the pixel groups. A ratio of a width c of a pixel group consisting of the sub-pixels 40 in the extension direction of the scan lines 30 to a length d of the pixel group in the extension direction of the data lines 20 is nearly 1:1.

In a certain embodiment, still referring to FIG. 2, each of the first pixel groups 50 includes a first sub-pixel 51 and a second sub-pixel 52 which are arranged in the extension direction of the data lines 20, and each of the second pixel groups 60 includes a third sub-pixel 61 and a fourth sub-pixel 62 which are arranged in the extension direction of the data lines 20. In this embodiment, each pixel point corresponds to a pixel group, that is, in this embodiment each pixel point corresponds to two sub-pixels 40 with different colors during operation of the array substrate. And in this embodiment, each pixel point corresponds to only one data line 20, which largely decreases the number of data lines 20 required in the array substrate for a same resolution and reduces the power consumption of the array substrate.

It should be noted that, for the array substrate according to the embodiment in the disclosure, in a case that a size of a pixel point is the same as a size of a pixel point in the conventional technology, each pixel group corresponding to a pixel point corresponds to two scan lines 30, which is one scan line 30 more than that in the conventional technology. However, since a power consumption of the scan line 30 is much lower than a power consumption of the data line 20, the overall power consumption can still be reduced with the array substrate provided according to the embodiment in the disclosure. In a case that a size of the sub-pixel is the same as a size of a sub-pixel in the conventional technology, that is, in a case that a1=a and b1=b where a1 denotes a width of a sub-pixel in an extension direction of a scan line and b1 denotes a length of a sub-pixel in an extension direction of a data line 20 in an array substrate in the conventional technology, since b is less than a, the number of columns of sub-pixels is decreased and the number of rows of sub-pixels is increased for an array substrate having a display region of the same size, when comparing this embodiment with the conventional technology. Therefore, the number of the data lines 20 correspondingly connected to the sub-pixels is decreased and the number of scan lines 30 correspondingly connected to the sub-pixels is increased. Since a power consumption of a scan line 30 is much lower than a power consumption of a data line 20, the overall power consumption can still be reduced with the array substrate provided according to the embodiment in the disclosure.

In a certain embodiment, still referring to FIG. 2, the first direction X is parallel to the extension direction of the scan lines 30. In another embodiment in the disclosure as shown in FIG. 4, which is a top view of an array substrate according to the embodiment in the disclosure, the first direction X is parallel to the extension direction of the data lines 20.

Hereinafter the array substrate according to the embodiments in the disclosure is described with an example that the first direction X is parallel to the extension direction of the scan lines 30.

Figure 4:
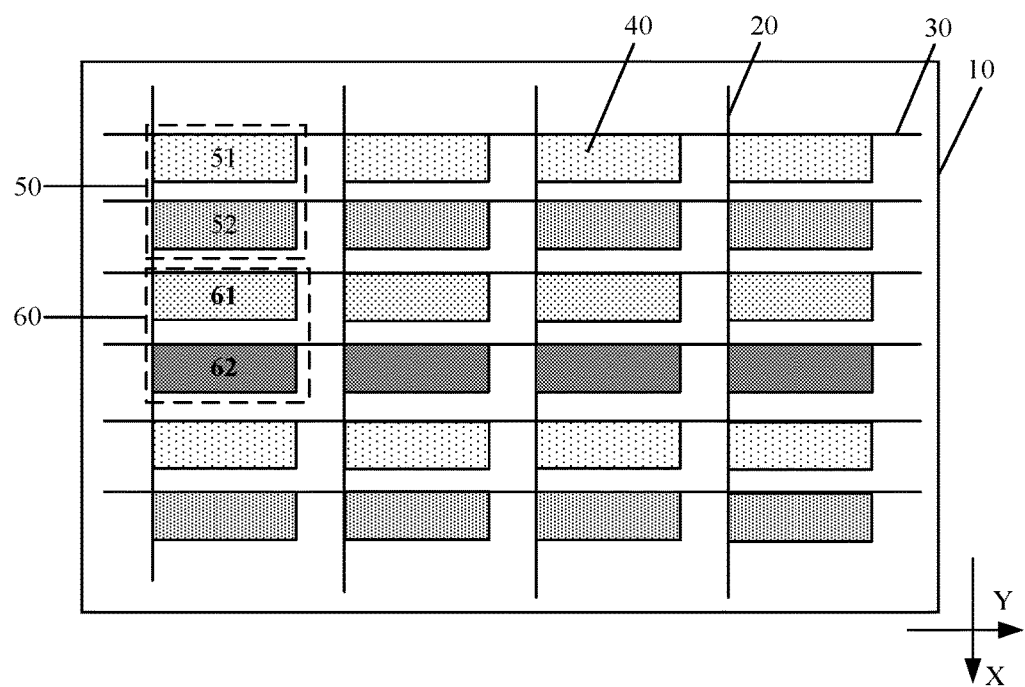
FIG. 4 is a top view of an array substrate according to another embodiment in the disclosure.

It should be noted that, in certain embodiments, as shown in FIG. 2 and FIG. 4, in a second direction Y, the first pixel groups 50 are arranged in lines along the second direction Y, and the second pixel groups 60 are arranged in other lines along the second direction Y. That is, in the second direction Y, the first pixel groups 50 are individually located in a line, and the second pixel groups 60 are individually located in another line. That is, pixel groups located in a same position in the first direction X and in different positions in the second direction Y are only the first pixel groups 50 or only the second pixel groups 60. The second direction Y is perpendicular to the first direction X.

Figure 5:
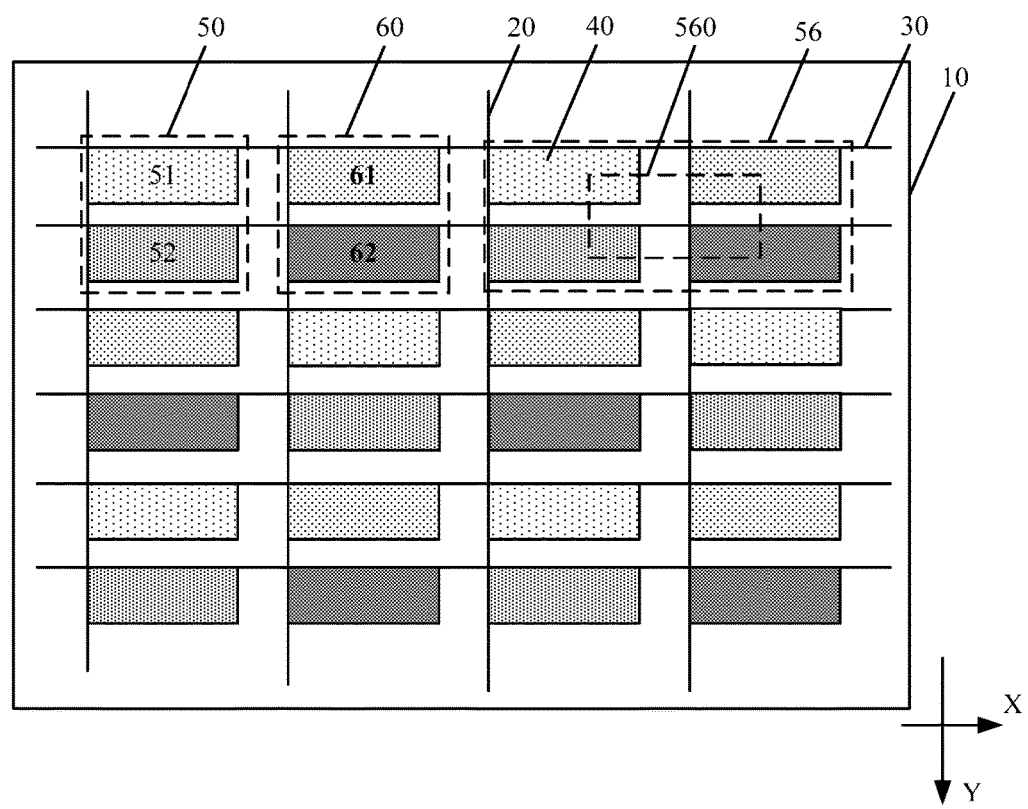
FIG. 5 is a top view of an array substrate according to another embodiment in the disclosure.

Reference is made to FIG. 5, which is a top view of an array substrate according to another embodiment in the disclosure. In this embodiment, the first pixel groups 50 and the second pixel groups 60 are arranged alternately in the second direction Y. That is, pixel groups located in a same position in the first direction X and in different positions in the second direction Y include both the first pixel groups 50 and the second pixel groups 60, and the first pixel groups 50 and the second pixel groups 60 are arranged alternately.

It should be noted that, in this embodiment, adjacent first pixel group 50 and second pixel group 60 form a pixel unit 56, lines connecting central points of adjacent sub-pixels 40 in the pixel unit 56 form a virtual display pixel 560, a size of the virtual display pixel 560 is the same as a size of a sub-pixel 40, and each sub-pixel 40 is shared by four surrounding virtual display pixels 560. Based on information of a picture displayed through four surrounding virtual display pixels 560, the shared sub-pixel 40 provides a proper brightness to meet display requirement of the four surrounding virtual display pixels 560. In the array substrate according to any one of the above embodiments, the size of the virtual display pixel 560 is the same as the size of a sub-pixel 40, which can enable more brightness gradient of the displayed picture to soften the picture.

In a certain embodiment, the array substrate includes a red sub-pixel, a green sub-pixel, a blue sub-pixel and a white sub-pixel. In this embodiment, the first sub-pixel 51, the second sub-pixel 52, the third sub-pixel 61 and the fourth sub-pixel 62 respectively correspond to one of the red sub-pixel, the green sub-pixel, the blue sub-pixel and the white sub-pixel.

Figure 6:
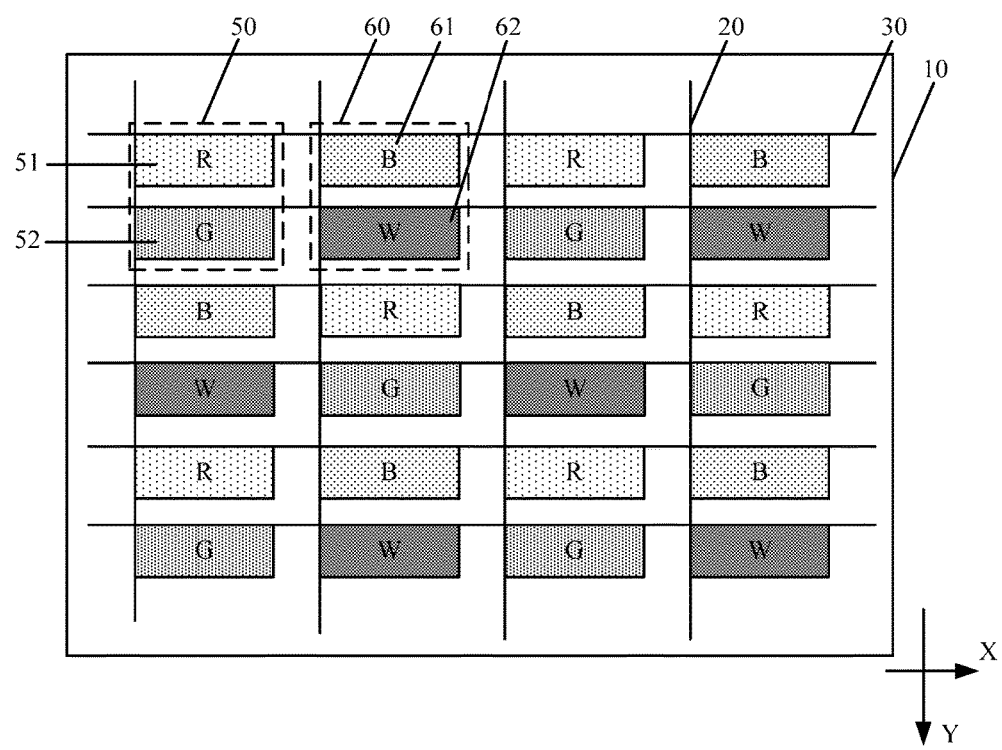
FIG. 6 is a top view of an array substrate according to another embodiment in the disclosure.

Reference is made to FIG. 6, which is a top view of an array substrate according to an embodiment in the disclosure. In this embodiment, the first sub-pixel 51 is the red sub-pixel, the second sub-pixel 52 is the green sub-pixel, the third sub-pixel 61 is the blue sub-pixel, and the fourth sub-pixel 62 is the white sub-pixel.

Figure 7:
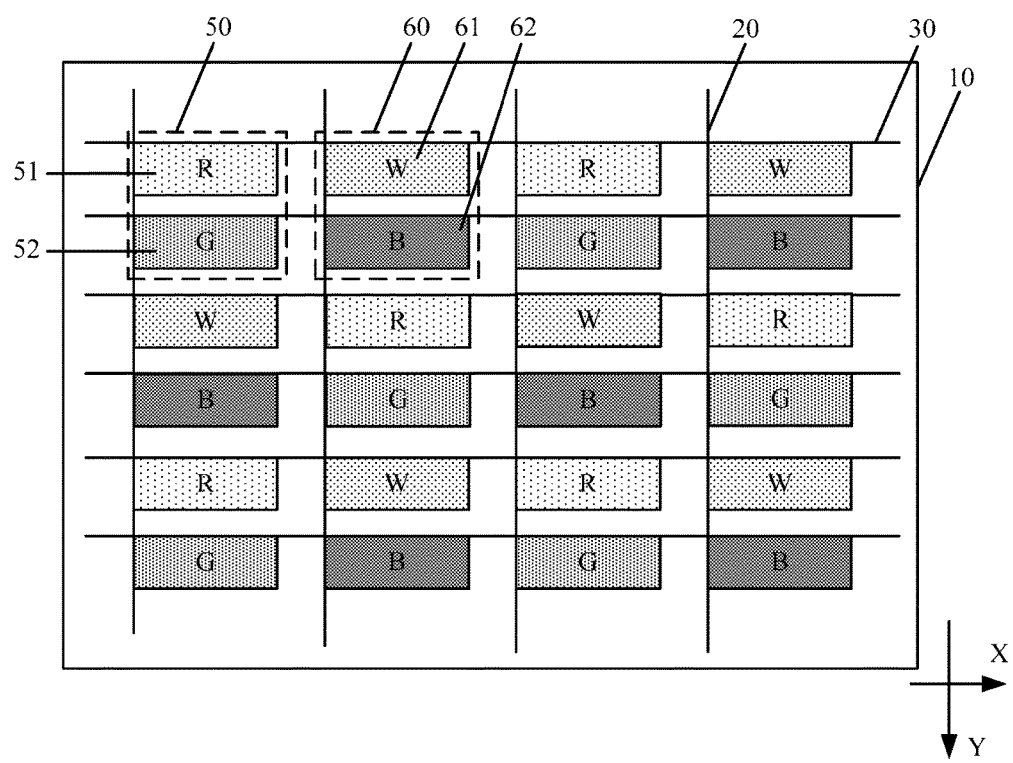
FIG. 7 is a top view of an array substrate according to another embodiment in the disclosure.

Reference is made to FIG. 7, which is a top view of an array substrate according to another embodiment in the disclosure. In this embodiment, the first sub-pixel 51 is the red sub-pixel, the second sub-pixel 52 is the green sub-pixel, the third sub-pixel 61 is the white sub-pixel, and the fourth sub-pixel 62 is the blue sub-pixel.

Figure 8:
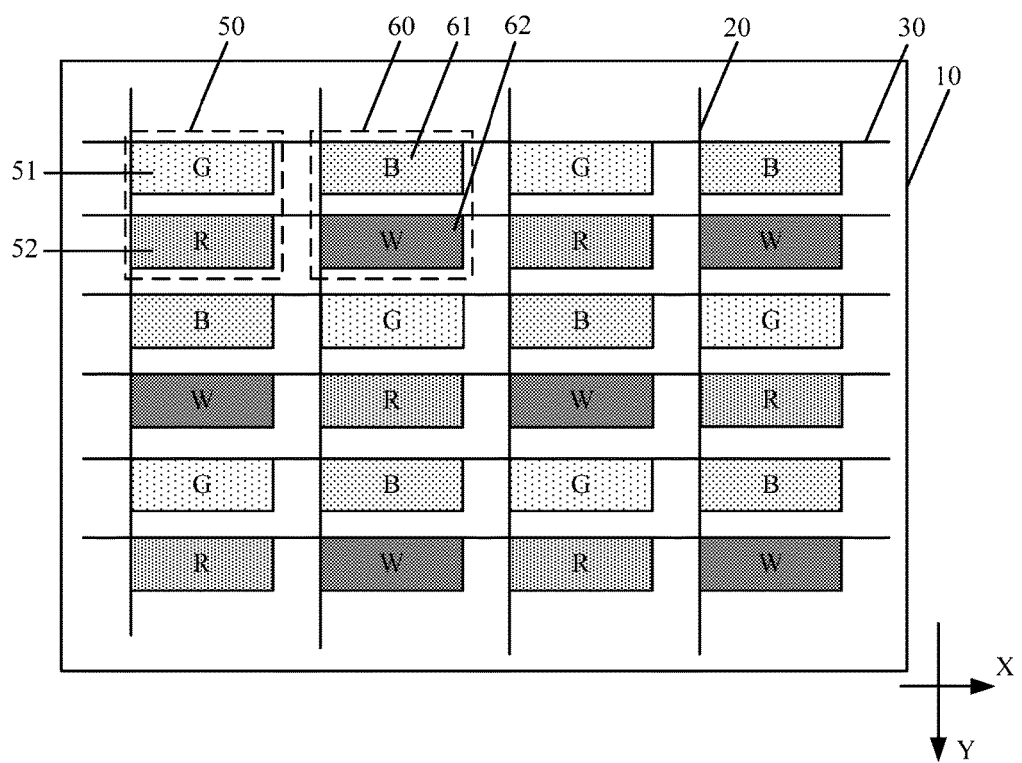
FIG. 8 is a top view of an array substrate according to another embodiment in the disclosure.

Reference is made to FIG. 8, which is a top view of an array substrate according to another embodiment in the disclosure. In this embodiment, the first sub-pixel 51 is the green sub-pixel, the second sub-pixel 52 is the red sub-pixel, the third sub-pixel 61 is the blue sub-pixel, and the fourth sub-pixel 62 is the white sub-pixel.

Figure 9:
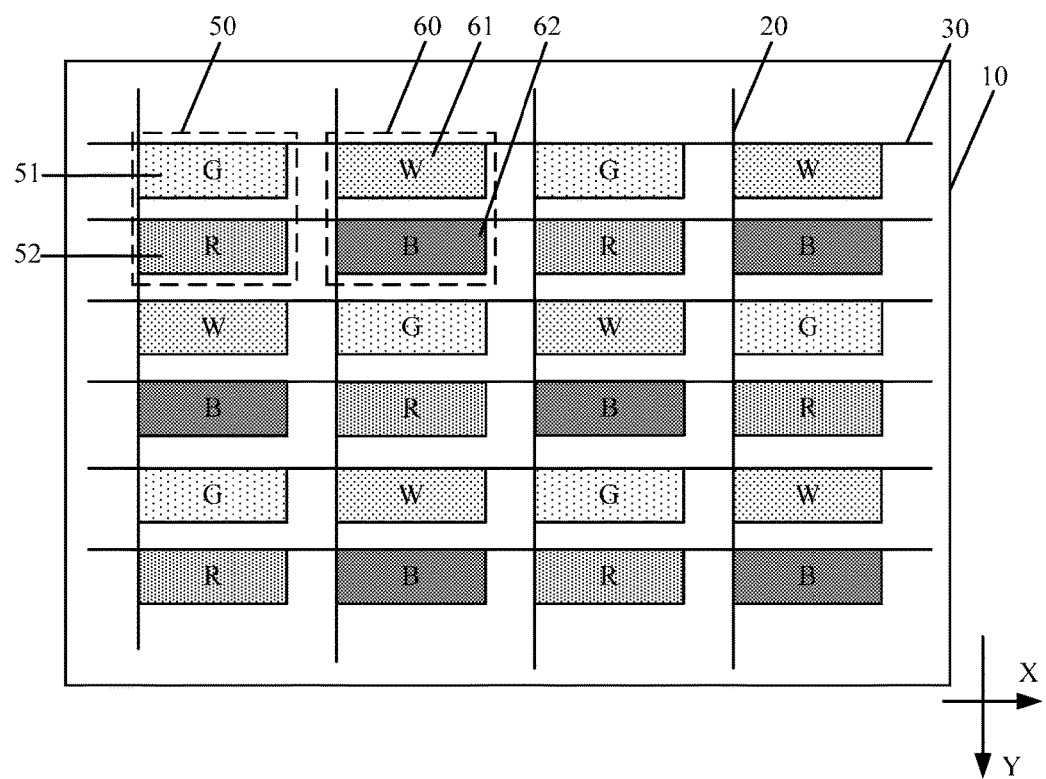
FIG. 9 is a top view of an array substrate according to another embodiment in the disclosure.

Reference is made to FIG. 9, which is a top view of an array substrate according to another embodiment in the disclosure. In this embodiment, the first sub-pixel 51 is the green sub-pixel, the second sub-pixel 52 is the red sub-pixel, the third sub-pixel 61 is the white sub-pixel, and the fourth sub-pixel 62 is the blue sub-pixel.

Figure 10:
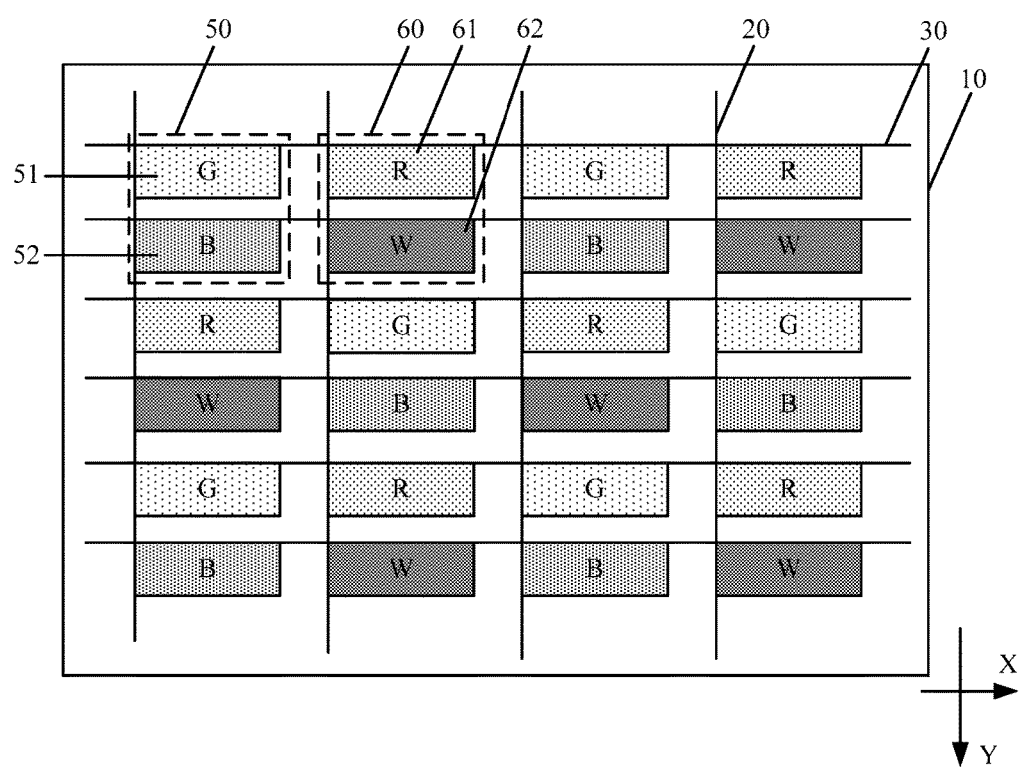
FIG. 10 is a top view of an array substrate according to another embodiment in the disclosure.

Reference is made to FIG. 10, which is a top view of an array substrate according to another embodiment in the disclosure. In this embodiment, the first sub-pixel 51 is the green sub-pixel, the second sub-pixel 52 is the blue sub-pixel, the third sub-pixel 61 is the red sub-pixel, and the fourth sub-pixel 62 is the white sub-pixel.

Figure 11:
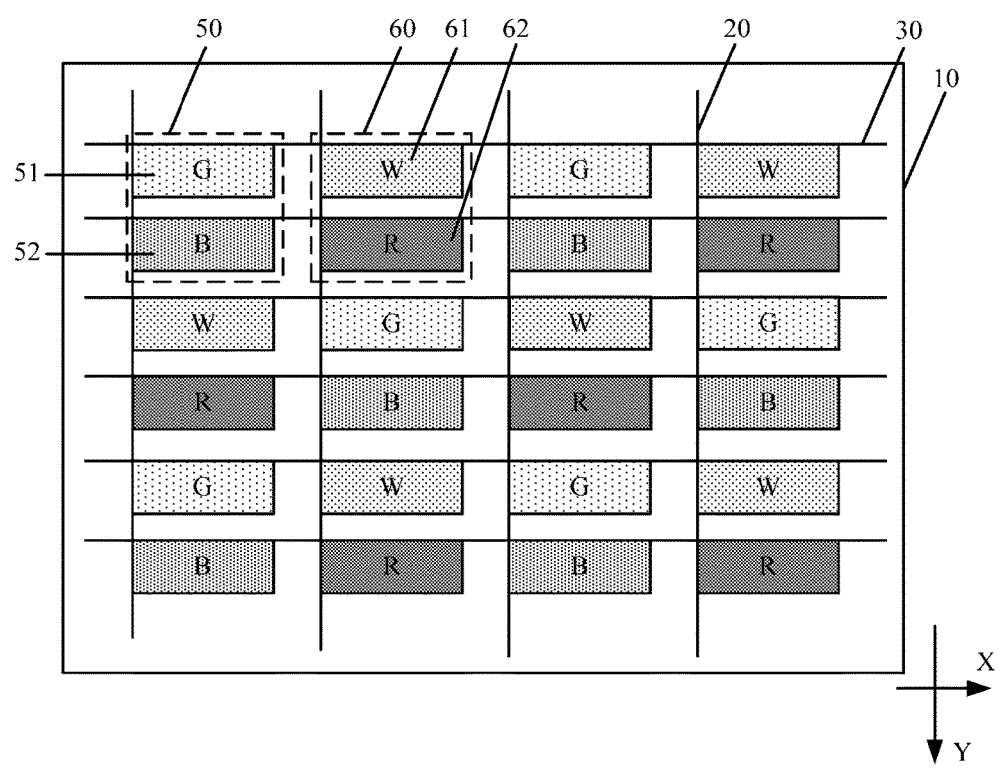
FIG. 11 is a top view of an array substrate according to another embodiment in the disclosure.

Reference is made to FIG. 11, which is a top view of an array substrate according to another embodiment in the disclosure. In this embodiment, the first sub-pixel 51 is the green sub-pixel, the second sub-pixel 52 is the blue sub-pixel, the third sub-pixel 61 is the white sub-pixel, and the fourth sub-pixel 62 is the red sub-pixel.

Figure 12:
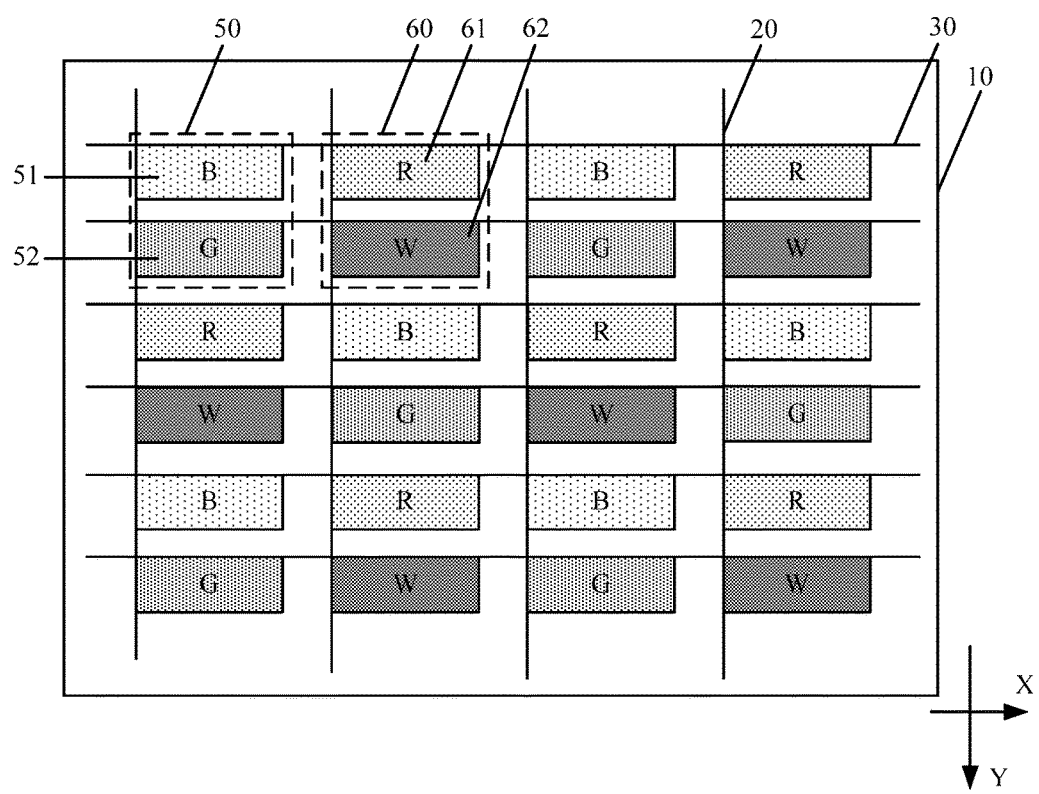
FIG. 12 is a top view of an array substrate according to another embodiment in the disclosure.

Reference is made to FIG. 12, which is a top view of an array substrate according to another embodiment in the disclosure. In this embodiment, the first sub-pixel 51 is the blue sub-pixel, the second sub-pixel 52 is the green sub-pixel, the third sub-pixel 61 is the red sub-pixel, and the fourth sub-pixel 62 is the white sub-pixel.

Figure 13:
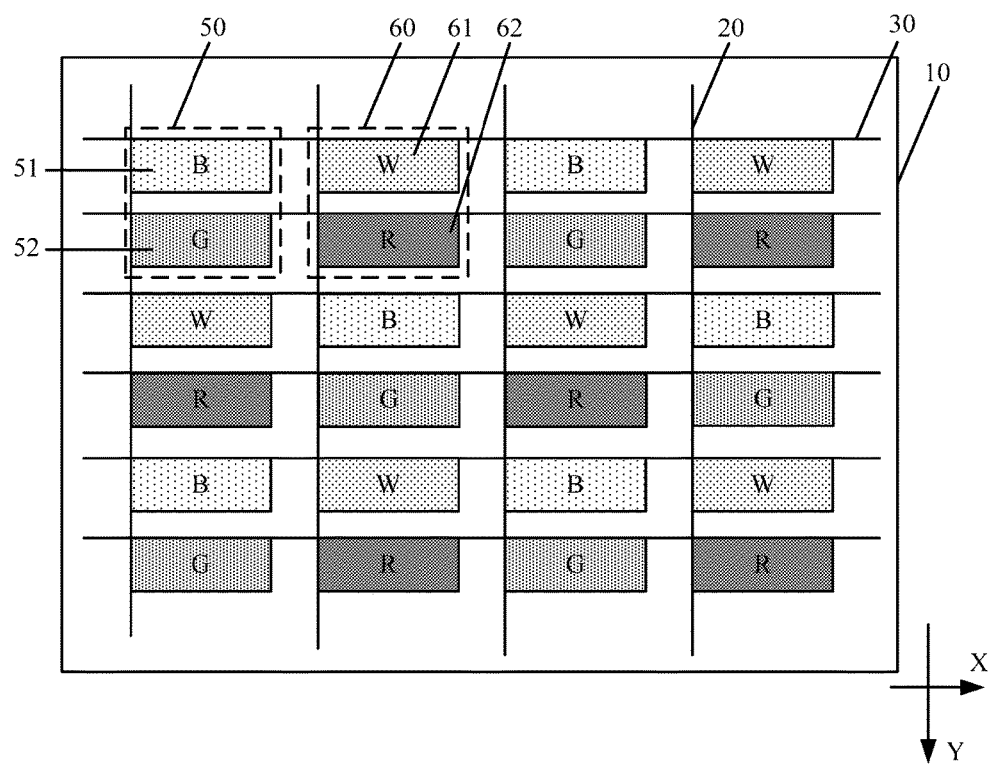
FIG. 13 is a top view of an array substrate according to another embodiment in the disclosure.

Reference is made to FIG. 13, which is a top view of an array substrate according to another embodiment in the disclosure. In this embodiment, the first sub-pixel 51 is the blue sub-pixel, the second sub-pixel 52 is the green sub-pixel, the third sub-pixel 61 is the white sub-pixel, and the fourth sub-pixel 62 is the red sub-pixel.

Figure 14:
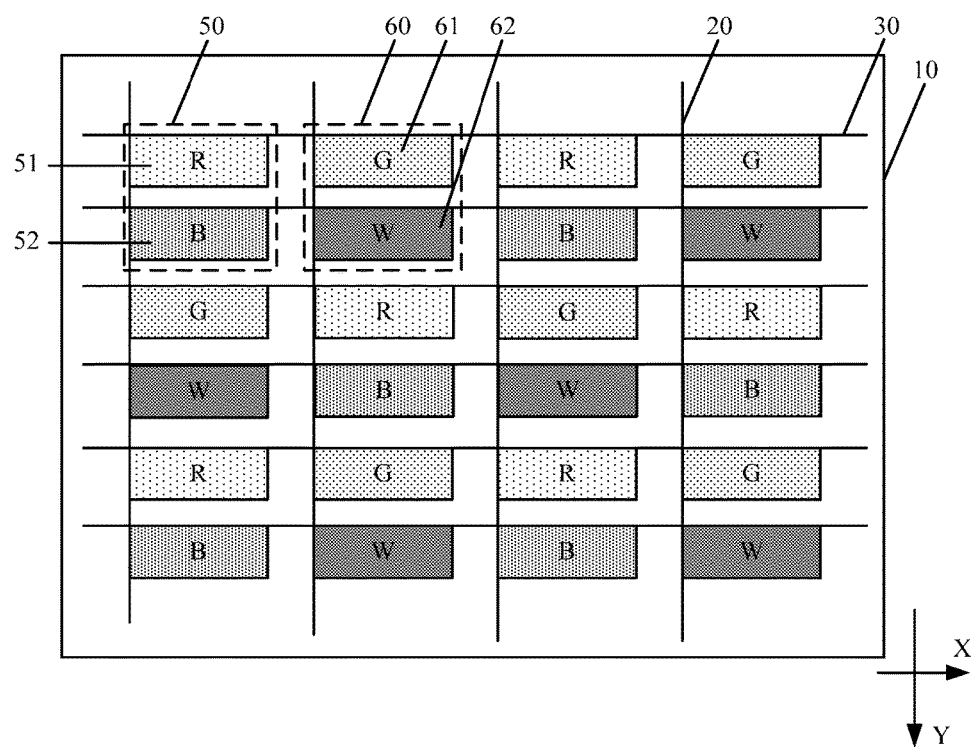
FIG. 14 is a top view of an array substrate according to another embodiment in the disclosure.

Reference is made to FIG. 14, which is a top view of an array substrate according to another embodiment in the disclosure. In this embodiment, the first sub-pixel 51 is the red sub-pixel, the second sub-pixel 52 is the blue sub-pixel, the third sub-pixel 61 is the green sub-pixel, and the fourth sub-pixel 62 is the white sub-pixel.

Figure 15:
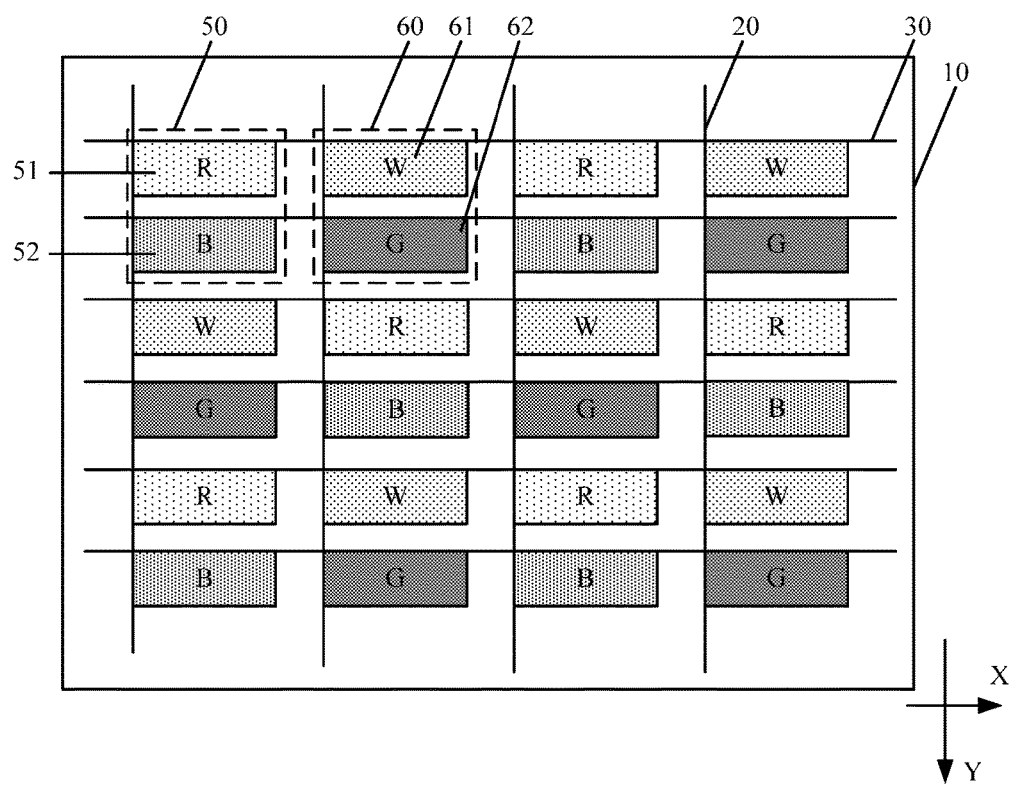
FIG. 15 is a top view of an array substrate according to another embodiment in the disclosure.

Reference is made to FIG. 15, which is a top view of an array substrate according to another embodiment in the disclosure. In this embodiment, the first sub-pixel 51 is the red sub-pixel, the second sub-pixel 52 is the blue sub-pixel, the third sub-pixel 61 is the white sub-pixel, and the fourth sub-pixel 62 is the green sub-pixel.

Figure 16:
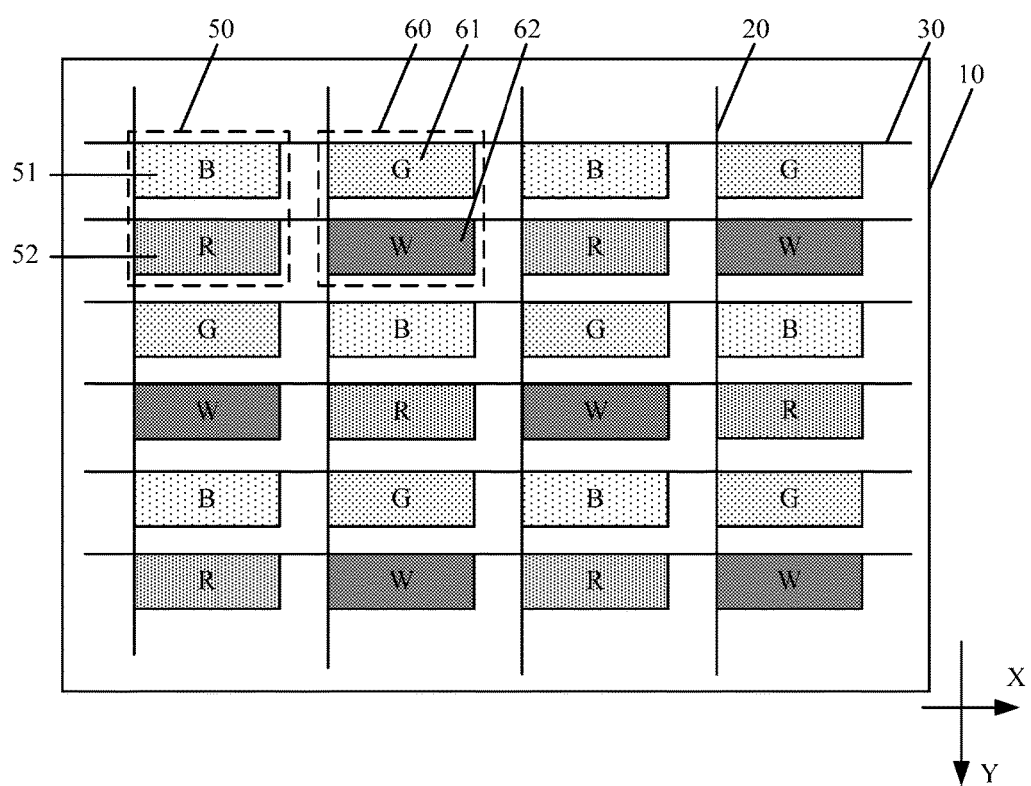
FIG. 16 is a top view of an array substrate according to another embodiment in the disclosure.

Reference is made to FIG. 16, which is a top view of an array substrate according to another embodiment in the disclosure. In this embodiment, the first sub-pixel 51 is the blue sub-pixel, the second sub-pixel 52 is the red sub-pixel, the third sub-pixel 61 is the green sub-pixel, and the fourth sub-pixel 62 is the white sub-pixel.

Figure 17:
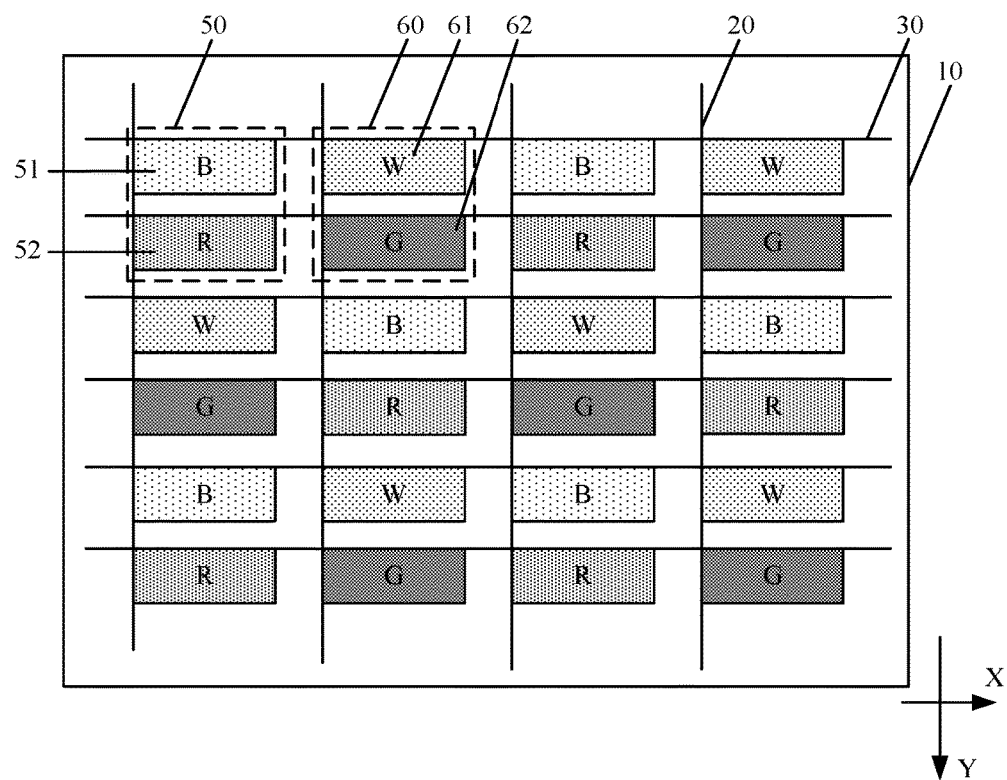
FIG. 17 is a top view of an array substrate according to another embodiment in the disclosure.

Reference is made to FIG. 17, which is a top view of an array substrate according to another embodiment in the disclosure. In this embodiment, the first sub-pixel 51 is the blue sub-pixel, the second sub-pixel 52 is the red sub-pixel, the third sub-pixel 61 is the white sub-pixel, and the fourth sub-pixel 62 is the green sub-pixel.

Figure 18:
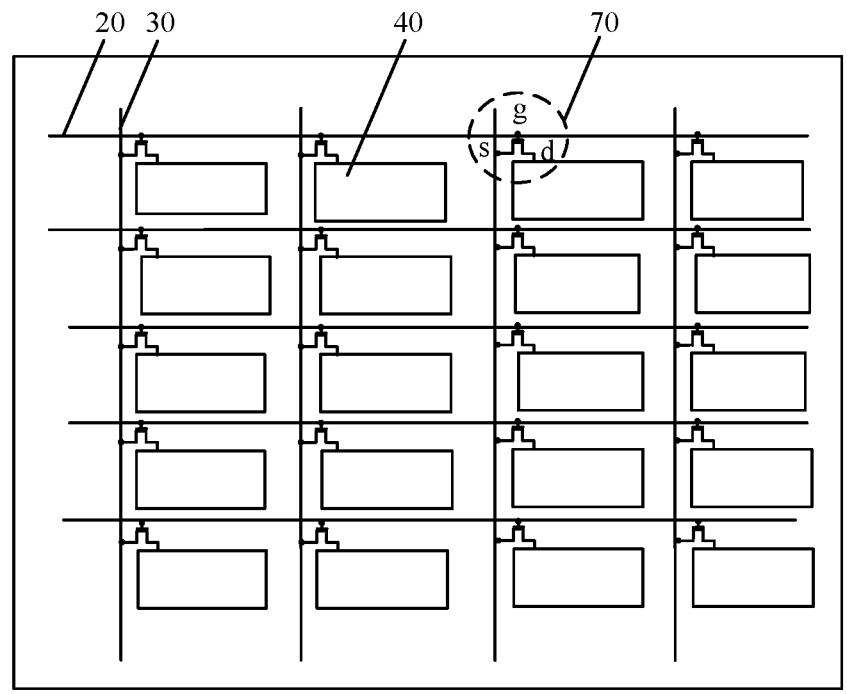
FIG. 18 is a top view of an array substrate according to another embodiment in the disclosure.

In a certain embodiment, as shown in FIG. 18, which is a top view of an array substrate according to an embodiment in the disclosure, the data lines 20 and the scan lines 30 control displays of the sub-pixels 40 via thin film transistors 70. Gate electrodes g of the thin film transistors 70 are electrically connected to the scan lines 30, source electrodes s of the thin film transistors 70 are electrically connected to the data lines 20, and drain electrodes d of the thin film transistors 70 provide driving signals to the sub-pixels 40 through pixel electrodes.

Figure 19:
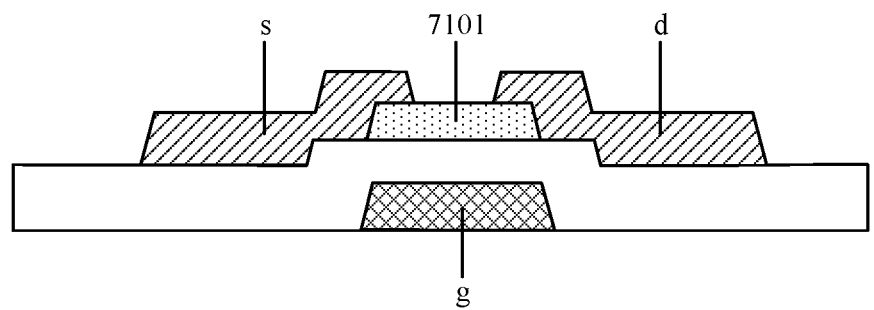
FIG. 19 is a sectional view of a thin film transistor in an array substrate according to an embodiment in the disclosure.

In a certain embodiment, the thin film transistors 70 are amorphous silicon thin film transistors. That is, the semiconductor layer in each of the thin film transistors 70 is made of amorphous silicon. Reference is made to FIG. 19, which shows a sectional view of a thin film transistor 70 in an array substrate according to an embodiment in the disclosure. The thin film transistor 70 includes a gate electrode g, a semiconductor layer 7101 which is located right above the gate electrode g and insulated from the gate electrode g via an insulation layer, a source electrode s and a drain electrode d which are oppositely arranged on two sides of the semiconductor layer 7101. The source electrode s covers a part of the semiconductor layer 7101, and the drain electrode d covers a part of the semiconductor layer 7101. The semiconductor layer 7101 is made of amorphous silicon.

Figure 20:
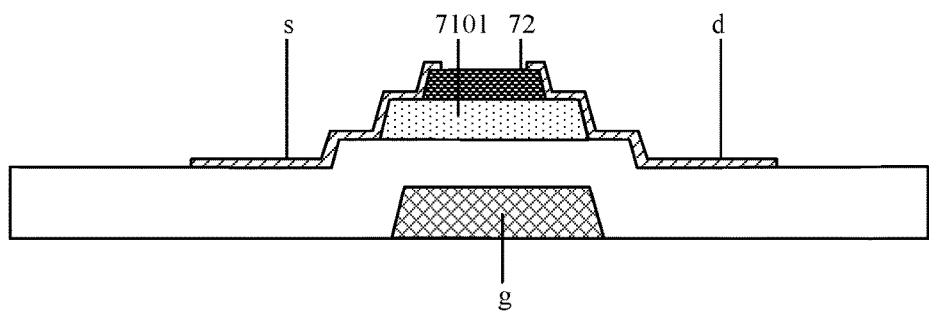
FIG. 20 is a sectional view of a thin film transistor in an array substrate according to another embodiment in the disclosure.

Reference is made to FIG. 20, which is a sectional view of a thin film transistor 70 in an array substrate according to an embodiment in the disclosure. Different from the structure of the thin film transistor 70 shown in FIG. 19, a semiconductor protective layer 72 is further provided on the surface of the semiconductor layer 7101 in this embodiment, in order to reduce a photocurrent of the semiconductor layer 7101 and avoid ions in each layer structure above the semiconductor layer 7101 from entering into the semiconductor layer 7101 and polluting the semiconductor layer 7101.

Figure 21:
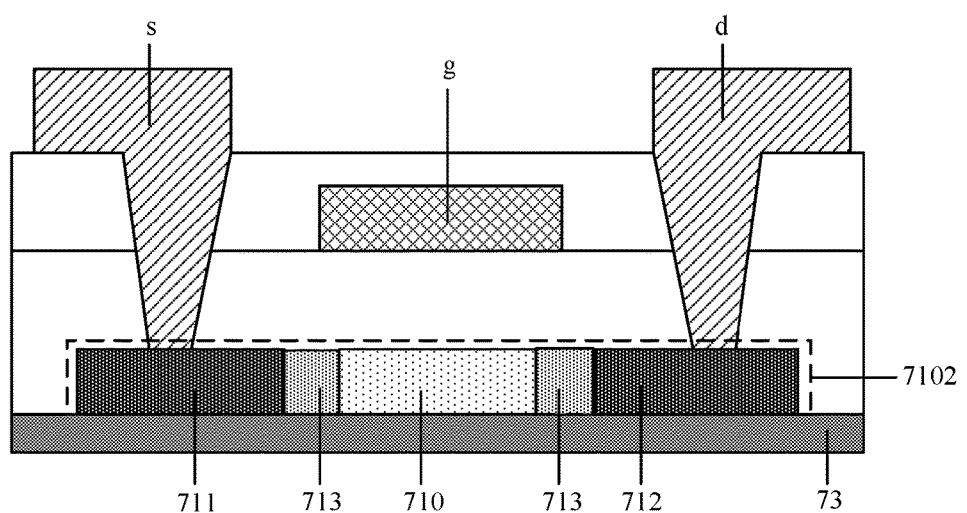
FIG. 21 is a sectional view of a thin film transistor in an array substrate according to an embodiment in the disclosure.

In another embodiment in the disclosure, the thin film transistors 70 are polysilicon thin film transistors. That is, the semiconductor layer in each of the thin film transistors 70 is made of polysilicon. Reference is made to FIG. 21, which is a sectional view of a thin film transistor 70 in an array substrate according to an embodiment in the disclosure. The thin film transistor 70 includes a semiconductor layer 7102. The semiconductor layer 7102 includes a source region 711 and a drain region 712 which are oppositely arranged and a channel region 710 arranged between the source region 711 and the drain region 712. A doping concentration of the source region 711 and the drain region 712 is larger than a doping concentration of the channel region 710. The semiconductor layer 7102 further includes a gate electrode g which is located right above the channel region 710 and insulated from the channel region 710 via an insulation layer. The semiconductor layer 7102 further includes a source electrode s which is located right above the source region 711, electrically connected to the source region 711 and insulated from the gate electrode g. The semiconductor layer 7102 further includes a drain electrode d which is located right above the drain region 712, electrically connected to the drain region 712 and insulated from the gate electrode g. The semiconductor layer 7102 further includes a light shielding layer 73 which is located on a side of the semiconductor layer 7102 facing away from the gate electrode g, to shield the light irradiating the semiconductor layer 7102 from the side of the semiconductor layer 7102 facing away from the gate electrode g. The semiconductor layer 7102 is made of polysilicon. It should be noted that, a transition region 713 is further provided between the source region 711 and the channel region 710, and a transition region 713 is also provided between the drain region 712 and the channel region 710. A doping concentration of the transition region 713 is less than a doping concentration of the source region 711 and the drain region 712 and larger than a doping concentration of the channel region 710, in order to reduce the intensity of a horizontal electric field between the source region 711 and the channel region 710 and a horizontal electric field between the drain region 712 and the channel region 710, to decrease the number of hot carriers generated from collision ionization caused due to acceleration of the horizontal electric field, thereby enabling a leakage current in the thin film transistor 70 to decrease by two orders of magnitude.

Figure 22:
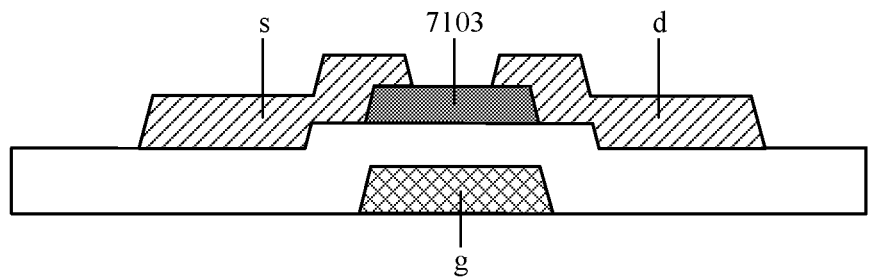
FIG. 22 is a sectional view of a thin film transistor in an array substrate according to an embodiment in the disclosure.

In another embodiment in the disclosure, the thin film transistors 70 are oxide semiconductor thin film transistors. That is, the semiconductor layer in each of the thin film transistors 70 is made of oxide semiconductor. Reference is made to FIG. 22, which is a sectional view of a thin film transistor 70 in an array substrate according to an embodiment in the disclosure. The thin film transistor 70 includes a gate electrode g, a semiconductor layer 7103 which is located right above the gate electrode g and insulated from the gate electrode g via an insulation layer, a source electrode s and a drain electrode d which are oppositely arranged on two sides of the semiconductor layer 7103. The source electrode s covers a part of the semiconductor layer 7103, and the drain electrode d covers a part of the semiconductor layer 7103. The semiconductor layer 7103 is made of oxide semiconductor.

Figure 23:
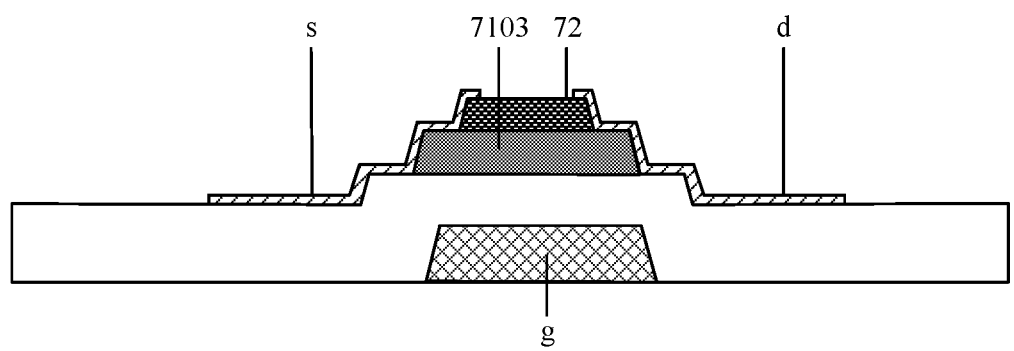
FIG. 23 is a sectional view of a thin film transistor in an array substrate according to another embodiment in the disclosure.

Reference is made to in FIG. 23, which is a sectional view of a thin film transistor 70 in an array substrate according to an embodiment in the disclosure. Different from the structure of the thin film transistor 70 shown in FIG. 22, a semiconductor protective layer 72 is further provided on the surface of the semiconductor layer 7101 in this embodiment, in order to avoid oxidation of the semiconductor 7103 caused due to oxygen in outside environment.

Figure 24:
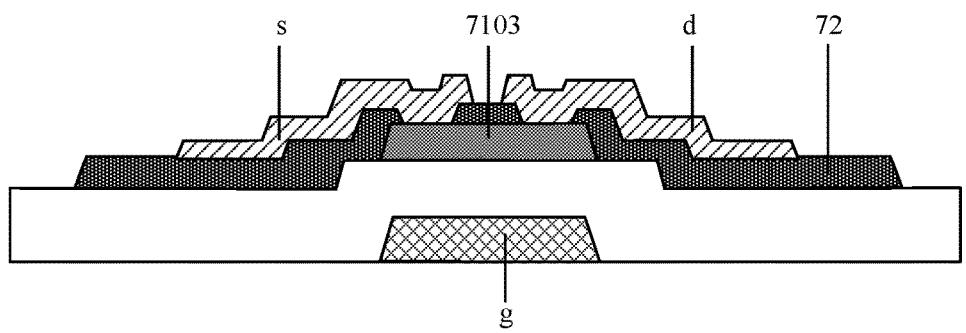
FIG. 24 is a sectional view of a thin film transistor in an array substrate according to another embodiment in the disclosure.

Reference is made to FIG. 24, which is a sectional view of a thin film transistor 70 in an array substrate according to an embodiment in the disclosure. Different from the structure of the thin film transistor 70 shown in FIG. 23, in this embodiment a semiconductor protective layer 72 is not only located on the upper surface of the semiconductor 7103, but also covers a surface of the insulation layer between the gate electrode g and the semiconductor layer 7103, in order to simplify the etching process of the semiconductor protective layer 72.

Figure 25:
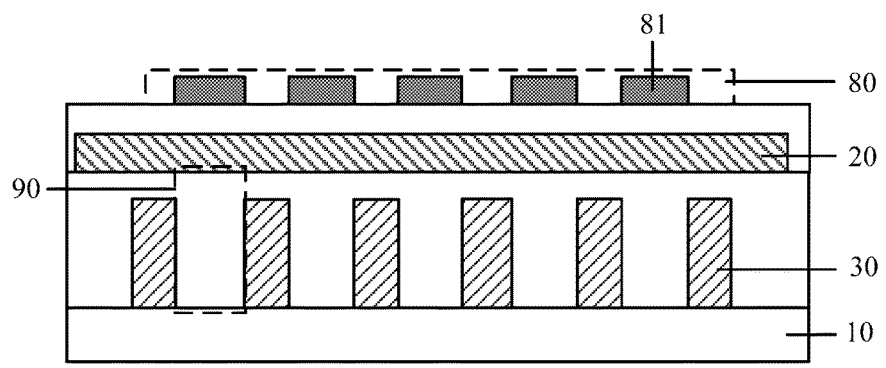
FIG. 25 is a schematic structural diagram of an array substrate according to another embodiment in the disclosure.

Reference is made to FIG. 25, which shows a schematic structural diagram of an array substrate according to an embodiment based on any one of the above embodiments. In this embodiment, the array substrate further includes a color film layer 80 located on a same side of the first substrate 10 as the data lines 20 and the scan lines 30. The color film layer 80 includes multiple color resistors 81. The color resistors 81 correspond in one-to-one correspondence to sub-pixel regions 90 corresponding to the sub-pixels.

Figure 26:
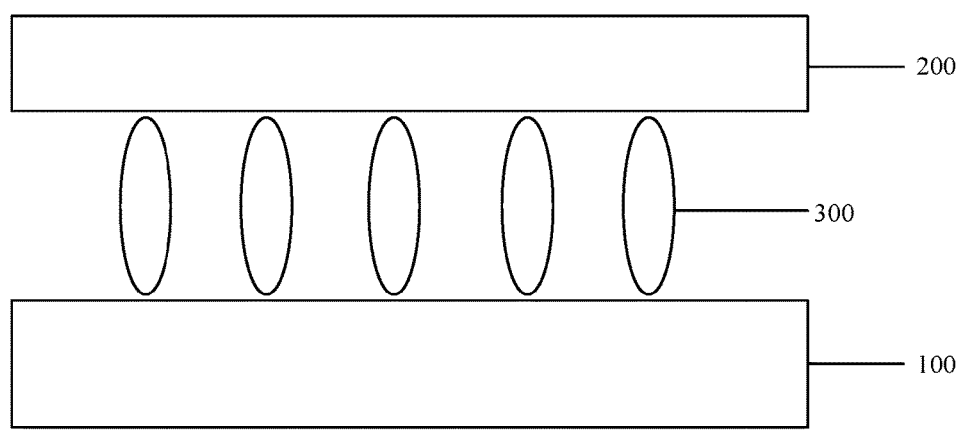
FIG. 26 is a schematic structural diagram of a display panel according to an embodiment in the disclosure.

Reference is made to FIG. 26, which is a schematic structural diagram of a display panel according to an embodiment in the disclosure. In this embodiment, the display panel includes an array substrate 100 and a second substrate 200 which are oppositely arranged and a liquid crystal layer 300 located between the array substrate 100 and the second substrate 200, where the array substrate 100 is the array substrate according to any one of the above embodiments.

The display panel provided according to the embodiments in the disclosure has beneficial effects of the array substrate provided according to the embodiments in the disclosure, reference of which can be made to the array substrate provided according to the above embodiments and is not repeated herein. It should be noted that, a liquid crystal drive mode of the display panel provided according to the above embodiment can operate in a plane switching (IPS) mode or a fringe filed switching (FFS) mode. In addition, in the display panel provided according to the above embodiments in the disclosure, the color film layer 80 is arranged on the array substrate 100, which can improve the aligning precision for attaching the array substrate 100 to the second substrate 200 and improve the yield of the display panel.

Parts of the specification are described in a progressive manner with emphasis placed on the difference between each part and the other parts. Therefore, they can be referred from one another for the same or similar parts.

With the above description of the disclosed embodiments, the technical solution in the disclosure can be implemented or used by persons skilled in the art. Various modifications made to these embodiments are apparent for persons skilled in the art, and the general principle defined in the disclosure can be implemented in other embodiments without departing from the spirit or scope of the disclosure. Therefore the disclosure is not limited to the embodiments described herein but confirms to a widest scope in accordance with principles and novel features disclosed herein.

The invention claimed is:

1. An array substrate, comprising:
   a first substrate; and
   a plurality of data lines and a plurality of scan lines located on a first side of the first substrate, the plurality of data lines and the plurality of scan lines defining a pixel array, wherein the pixel array comprises:
   a plurality of first pixel groups and a plurality of second pixel groups, wherein
   each of the first pixel groups and the second pixel groups comprises at least two adjacent sub-pixels, the at least two adjacent sub-pixels being connected to a same one of the plurality of data lines and different ones of the plurality of scan lines;
   a length of each of the sub-pixels in an extension direction of the data lines is less than a width of each of the sub-pixels in an extension direction of the scan lines;
   the first pixel groups and the second pixel groups are arranged in a matrix form;
   the at least two adjacent sub-pixels exhibit different colors, and any color exhibited by the first groups is different from any color exhibited by the second groups; and
   the first pixel groups and the second pixel groups are arranged alternately in a first direction.

2. The array substrate according to claim 1, wherein the width of each of the sub-pixels in the extension direction of the scan lines is 2 to 4 times of the length of each of the sub-pixels in the extension direction of the data lines, inclusive.

3. The array substrate according to claim 1, wherein each of the first pixel groups comprises a first sub-pixel and a second sub-pixel which are arranged along the extension direction of the data lines, and each of the second pixel groups comprises a third sub-pixel and a fourth sub-pixel which are arranged along the extension direction of the data lines.

4. The array substrate according to claim 3, wherein the first direction is parallel to the extension direction of the data lines or parallel to the extension direction of the scan lines.

5. The array substrate according to claim 4, wherein the first pixel groups and the second pixel groups are arranged in separate lines in a second direction perpendicular to the first direction.

6. The array substrate according to claim 4, wherein the first pixel groups and the second pixel groups are further arranged alternately in a second direction perpendicular to the first direction.

7. The array substrate according to claim 3, wherein the first sub-pixel, the second sub-pixel, the third sub-pixel and the fourth sub-pixel respectively correspond to one of a red sub-pixel, a green sub-pixel, a blue sub-pixel and a white sub-pixel.

8. The array substrate according to claim 7, wherein the first sub-pixel is the red sub-pixel, the second sub-pixel is the green sub-pixel, the third sub-pixel is the blue sub-pixel, and the fourth sub-pixel is the white sub-pixel.

9. The array substrate according to claim 7, wherein the first sub-pixel is the red sub-pixel, the second sub-pixel is the green sub-pixel, the third sub-pixel is the white sub-pixel, and the fourth sub-pixel is the blue sub-pixel.

10. The array substrate according to claim 7, wherein the first sub-pixel is the green sub-pixel, the second sub-pixel is the blue sub-pixel, the third sub-pixel is the red sub-pixel, and the fourth sub-pixel is the white sub-pixel.

11. The array substrate according to claim 7, wherein the first sub-pixel is the green sub-pixel, the second sub-pixel is the blue sub-pixel, the third sub-pixel is the white sub-pixel, and the fourth sub-pixel is the red sub-pixel.

12. The array substrate according to claim 1, wherein
    the data lines and the scan lines control the sub-pixels via thin film transistors,
    gate electrodes of the thin film transistors are electrically connected to the scan lines, source electrodes of the thin film transistors are electrically connected to the data lines, and
    drain electrodes of the thin film transistors provide driving signals for the sub-pixels through pixel electrodes; and, wherein
    the thin film transistors are amorphous silicon thin film transistors, polysilicon thin film transistors or metal oxide thin film transistors.

13. The array substrate according to claim 1, further comprising:
    a color film layer comprising a plurality of color resistors, wherein the color film layer and the data lines are located on a same side of the first substrate, and each of the color resistors corresponds to a corresponding sub-pixel such that the color resistors and sub-pixels are in a one-to-one correspondence.

14. A display panel, comprising:
    an array substrate and a second substrate which are oppositely arranged and a liquid crystal layer located between the array substrate and the second substrate, wherein the array substrate comprises:
    a first substrate; and
    a plurality of data lines located on a first side of the first substrate and a plurality of scan lines located on the first side of the first substrate, the plurality of data lines and the plurality of scan lines defining a pixel array, wherein the pixel array comprises:
    a plurality of first pixel groups and a plurality of second pixel groups, wherein
    each of the first pixel groups and the second pixel groups comprises at least two adjacent sub-pixels, the at least two adjacent sub-pixels being connected to a same one of the plurality of data lines and different ones of the plurality of scan lines;
    a length of each of the sub-pixels in an extension direction of the data lines is less than a width of each of the sub-pixels in an extension direction of the scan lines;
    the first pixel groups and the second pixel groups are arranged in a matrix form;
    the at least two adjacent sub-pixels exhibit different colors, and any color exhibited by the first groups is different from any color exhibited by the second groups; and
    the first pixel groups and the second pixel groups are arranged alternately in a first direction.

15. The display panel according to claim 14, wherein the width of each of the sub-pixels in the extension direction of the scan lines is 2 to 4 times of the length of each of the sub-pixels in the extension direction of the data lines, inclusive.

16. The display panel according to claim 14, wherein each of the first pixel groups comprises a first sub-pixel and a second sub-pixel which are arranged along the extension direction of the data lines, and each of the second pixel groups comprises a third sub-pixel and a fourth sub-pixel which are arranged along the extension direction of the data lines.

17. The display panel according to claim 16, wherein the first direction is parallel to the extension direction of the data lines or parallel to the extension direction of the scan lines.

18. The display panel according to claim 17, wherein the first pixel groups and the second pixel groups are arranged in separate lines in a second direction perpendicular to the first direction.

19. The display panel according to claim 17, wherein the first pixel groups and the second pixel groups are further arranged alternately in a second direction perpendicular to the first direction.

20. The display panel according to claim 14, further comprising:
   a color film layer, wherein the color film layer and the data line are located on a same side of the first substrate, the color film layer comprises a plurality of color resistors, and the color resistors corresponds to the sub-pixels in one-to-one correspondence.

* * * * *